Patented July 21, 1942

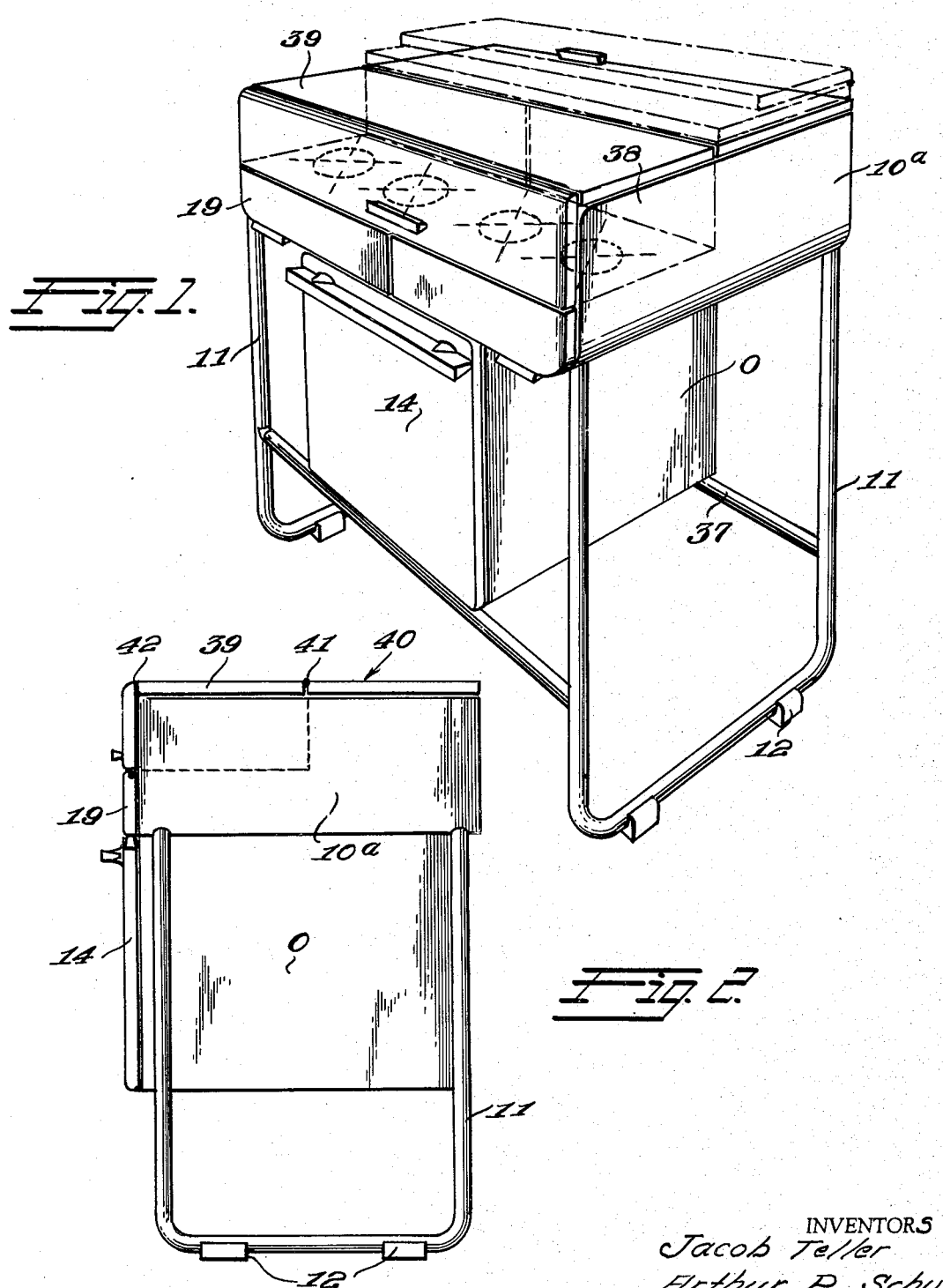

2,290,781

UNITED STATES PATENT OFFICE 2,290,781

COOKING RANGE

Jacob Teller, Chicago, and Arthur P. Schulz, Hinsdale, Ill., assignors to G. and J. Teller, Chicago, Ill., a partnership composed of Grace Teller and Jacob Teller Application November 12, 1938, Serial No. 240,172

2 Claims. (Cl. 126—39)

This invention relates to cooking ranges.

While not necessarily being limited thereto, the invention as disclosed preferably pertains to gas ranges and is particularly concerned with an improved arrangement of cooking top, pastry oven and broiler compartment.

A primary object of the invention is to provide a range having a combined working and cooking top at the front thereof which accommodates a plurality of cooking burners, and a readily accessible pastry oven and broiler compartment immediately to the rear of the combined working and cooking top.

A further object of the invention is to provide a gas range which embodies a frame supported sheet metal casing, the front of the casing accommodating four-in-line cooking burners and providing a combined cooking and working top, and the rear of the casing providing a readily accessible pastry oven and broiler compartment.

A still further object of the invention is to provide a gas range of the above noted character wherein a multiple hinged cover is provided for the pastry oven, broiler compartment, and combined cooking and working top and which in normal closed position provides a table top of the combined areas of the combined cooking and working top, pastry oven and broiler compartment.

A still further object of the invention is to provide a gas range which is light in construction, attractive in appearance, which offers maximum working space, and which embodies readily accessible cooking units.

For a more complete understanding of the nature and objects of the invention, reference will be had to the following detailed description, taken in connection with the accompanying drawing, wherein:

Fig. 1 is a perspective view of the invention.

Fig. 2 is an end elevation of the construction shown in Fig. 1.

In the form of range, according to Figs. 1 and 2, the casing 10a includes end extensions 38 of a depth equal to that of the broiler compartment and pastry oven and a multi-hinged cover 39 is provided and which as is indicated in Fig. 2 and in full lines in Fig. 1, conceals the cooking top 20 and provides a table top 40 of the full horizontal area of casing 10. When using the cooking burners 16 the cover 39 may be readily folded back about pivots 41 and 42 upon the tops of the broiler compartment and pastry oven as is indicated by dot and dash lines in Fig. 1.

This structure is supported on leg frames 11 which are held off of the floor by short legs 12. The leg frames are connected by tie rods 37 which support an oven O provided with a door 14. Doors 19 serve to enclose the burner valves, the latter not being shown as unnecessary to an understanding of the invention.

It will be readily appreciated from the foregoing disclosure that in accordance with the invention a range is provided which is relatively light in weight, attractive in appearance, and whose cooking units are readily accessible and convenient for operation.

What is claimed and desired to be secured by U. S. Letters Patent is:

1. A cooking range including a frame, a rectangular casing supported on said frame, said casing including a shallow front portion and a deep rear portion and having end walls of equal depth throughout, said front portion forming a cooking burner compartment and the rear portion forming broiler and pastry oven compartments, said rear portion having a flat working top, and a leaf forming a combined working top and front compartment cover having its rear edge hinged to the front edge of the rear compartment, said leaf in one position resting on the top edges of the front ends of said end walls and in a second position resting on top of the top of the rear portion.

2. A cooking range including a frame, a rectangular casing supported on said frame, said casing including a shallow front portion and a deep rear portion and having end walls of equal depth throughout, said front portion forming a cooking burner compartment and the rear portion forming broiler and pastry oven compartments, said rear portion having a flat working top, a leaf forming a combined working top and front compartment cover having its rear edge hinged to the front edge of the rear compartment, said leaf in one position resting on the top edges of the front ends of said end walls and in a second position resting on top of the top of the rear portion, and a second leaf hinged to the front edge of the first leaf, the second leaf depending from the front edge of the first leaf upon the latter being unfolded, said second leaf resting upon the first leaf upon the latter being in folded position.

JACOB TELLER.
ARTHUR P. SCHULZ.